(12) United States Patent
Medalsy et al.

(10) Patent No.: US 11,225,028 B2
(45) Date of Patent: Jan. 18, 2022

(54) METHODS OF REPRESENTING THREE DIMENSIONAL ARTICLES TO BE PRODUCED USING ADDITIVE MANUFACTURING PROCESSES IN DIGITAL FILE FORMATS

(71) Applicant: NEXA3D INC., Ventura, CA (US)

(72) Inventors: Izhar Medalsy, Ventura, CA (US); Itay Barel, Santa Barbara, CA (US)

(73) Assignee: NEXA3D INC., Ventura, CA (US)

( * ) Notice: Subject to any disclaimer, the term of this patent is extended or adjusted under 35 U.S.C. 154(b) by 78 days.

(21) Appl. No.: 16/684,132

(22) Filed: Nov. 14, 2019

(65) Prior Publication Data

US 2021/0146627 A1 May 20, 2021

(51) Int. Cl.
| | | |
|---|---|---|
| *B29C 64/393* | (2017.01) | |
| *B33Y 50/02* | (2015.01) | |
| *B33Y 10/00* | (2015.01) | |
| *G06F 30/00* | (2020.01) | |

(52) U.S. Cl.
CPC ............ *B29C 64/393* (2017.08); *B33Y 10/00* (2014.12); *B33Y 50/02* (2014.12); *G06F 30/00* (2020.01)

(58) Field of Classification Search
CPC .................................................... B29C 64/393
USPC ............................................................ 700/98
See application file for complete search history.

(56) References Cited

U.S. PATENT DOCUMENTS

| | | | |
|---|---|---|---|
| 2013/0182960 A1* | 7/2013 | Cai .......................... | G06T 17/10 |
| | | | 382/195 |
| 2018/0186092 A1* | 7/2018 | Nordback .............. | B33Y 50/02 |
| 2018/0280145 A1* | 10/2018 | Jones .................... | A61C 8/0013 |
| 2021/0100504 A1* | 4/2021 | Pushpala ................ | A61B 5/685 |

FOREIGN PATENT DOCUMENTS

WO WO-2013007171 A1 * 1/2013 ........... H04N 13/161

* cited by examiner

*Primary Examiner* — Suresh Suryawanshi
(74) *Attorney, Agent, or Firm* — Ascenda Law Group, PC

(57) ABSTRACT

A design with multiple instances of a three-dimensional article is printed by first defining a unit cell that includes a single instance of a three-dimensional article that repeats in the design along with its nearest neighbor elements in both a plane of a build plate of a target printer on which the design is to be printed and a plane orthogonal thereto. The design is represented in an output file of a design application and a slicer application then generates instructions to manufacture the design by the target printer. The instructions (g-code) include directions to print, for each of a specified number of layers a number of instances of the unit cell that can be accommodated within a build envelop of the target printer per layer as determined by said slicer application. The design is printed by the printer according to the instructions from the slicer application.

3 Claims, 5 Drawing Sheets

METHODS OF REPRESENTING THREE DIMENSIONAL ARTICLES TO BE PRODUCED USING ADDITIVE MANUFACTURING PROCESSES IN DIGITAL FILE FORMATS

FIELD OF THE INVENTION

The present invention relates to additive manufacturing processes and, in particular, to methods of representing three dimensional (3D) articles to be produced using such processes, including vat polymerization processes, in digital file formats.

BACKGROUND

Additive manufacturing, or 3D printing as it is known, is a collection of different technologies that provide different means of direct production of various articles. For example, material extrusion is a 3D printing process in which a thin filament of solid material, usually a thermoplastic, is heated to melting and forced through a nozzle onto a build platform according to desired relative motions of the nozzle and build plate. The heated filament cools and solidifies on the build plate to form the desired article. Fused deposition molding (FDM) is a similar technology but uses a wire filament instead of a thermoplastic medium to fashion the article under construction. Vat polymerization technologies include stereolithography (SLA) and direct light processing (DLP). These techniques generally involve the selective curing of resins contained in a vat using light sources. The resin is cured layer by layer so that the article under manufacture is created through a successive series of cross-sections that adhere to one another. Powder bed fusion processes such as selective laser sintering (SLS) use thermal energy, typically provided by one or more lasers, to fuse powdered metals, ceramics, or other materials, again layer by layer, to build the article. Material jetting, e.g., drop on demand (DOD), technology is a printing process in which droplets of material (typically wax or polymers) are selectively deposited and cured on a build plate to form an article. Other 3D printing process also exist.

Regardless of the ultimate manufacturing technology employed, workflows for 3D printing processes follow a generally common course. Initially, the article to be manufactured is designed using a computer system running a form of 3D design software, commonly referred to as computer aided design or CAD software. Many commercial CAD software packages exist for both amateur and professional designers and engineers and they each generally allow the operator to design an article of interest in a virtual 3D space. While the different CAD software packages vary in terms of their capabilities and features, all generally permit the operator to save an output file that includes specifications of the article of interest in one of a number of file formats. Common output file formats used in connection with 3D printing technologies include .stl (variously known as standard triangle language, stereolithography, or standard tessellation language), .STEP (standard for the exchange of product data), and .obj (an open file format for representing 3D geometries). Of course, many other file formats compatible with 3D printing technologies exist.

Once the design of the article is complete, the output file that describes the article is generated (in one of the various output file formats) and provided to another software tool known as a "slicer." Slicer applications may be stand-alone applications that run on computer systems or they may be integrated with the target printer on which the subject article is to be manufactured. The slicer application converts the 3D object described in the output file from the CAD software into specific instructions for the printer. For example, slicer application output files are commonly expressed as g-code, a popular instruction format for computer controlled machining. In general, the slicer application divides the article described by the CAD output file into a set of successive layers of specified thickness (usually uniform thickness), and then describes the layers as linear or planar movements of a nozzle, extruder, or laser, for additive manufacturing processes involving such apparatus, or as planar pixel maps for additive manufacturing processes such as DLP. Additional instructions to account for fill and support structures are also typically included. The output of the slicer application (e.g., the g-code) is then executed by the printer to produce the target article.

Although it is relatively dated in terms of 3D printing technology and has limitations (an inability to specify color, for example), the .stl file format remains one of, if not the most popular file format for 3D printing today. .stl files describe a 3D article in terms of its surface geometry by expressing that surface as a number of triangular tiles adjacent one another along their edges. In order to better represent the true geometry of curved surfaces and other article details, the triangles can be made arbitrarily small. Doing so increases the precision of the .stl representation of the article to be manufactured, but it also means that a sizeable amount of information must be included. For each triangle, the spatial coordinates of its vertices as well as a so-called normal vector must be specified, typically as floating-point numbers. Thus, .stl files for many articles can quickly become very large, e.g., on the order of tens of gigabytes, making them unwieldy in terms of storage requirements and for transfer by electronic means. The same is generally true for other 3D object file formats (.obj for example) where highly detailed geometries and/or large volumes lead to very large file sizes. In addition, these very large files often take many hours or even days for a slicer application to process.

SUMMARY OF THE INVENTION

In one embodiment, printing a design that includes multiple instances of a 3D article is performed by first identifying in the design, repeating instances of a three-dimensional article to be printed and defining a unit cell that includes a single instance of the three-dimensional article as well as nearest neighbor elements of the design to the single instance of the article in a plane of a build plate of a target printer on which the design is to be printed and a plane orthogonal thereto. For a design application output file that includes said unit cell, a slicer application generates instructions to manufacture the design by the target printer. Those instructions include directions to print, for each of a specified number of layers, a number of instances of the unit cell that can be accommodated within a build envelop of the target printer per layer, as determined by the slicer application. The design is printed by the target printer according to the instructions produced by the slicer application.

The process is applicable for any 3D design file type and for a variety of 3D printing technologies.

BRIEF DESCRIPTION OF THE DRAWINGS

The present invention is illustrated by way of example, and not limitation, in the figures of the accompanying drawings, in which:

FIG. 3 illustrates a single instance of the article, FIG. 4 shown a plan view of a single layer of multiple instances of the article against the backdrop of the build plate, and FIG. 5 illustrates an elevation view of multiple layers of the multiple instances of the article as are to be printed.

DETAILED DESCRIPTION

Recognizing the difficulties and inconveniences posed by the very large file sizes of .stl and other 3D design software representations of articles to be manufactured using 3D printing technologies, the present inventors have devised methods of representing 3D articles to be produced using such processes, including vat polymerization processes, in digital file formats that are much smaller in size. The smaller file sizes allow for reduced storage requirements and for easier transfer by electronic means (e.g., email, etc.) than is the case for conventional 3D design software output file representations of such articles. In addition, the time required for slicer applications to process such files is reduced over that required for processing conventional 3D design software output file representations of such articles.

The present methods are especially well suited for use with designs that call for printing of repeated patterns over an entirety of a build plate and/or in a direction orthogonal thereto. However, they may find application in other situations as well. For convenience, the remainder of the discussion will use an example that requires printing of a repeated pattern over the entirety of a build plate of a vat polymerization printer and for multiple layers. However, those of ordinary skill in the art will appreciate that the techniques presented by way of this example may be readily adapted for use in other contexts, e.g., with other printing technologies, and/or article designs.

Figure 1:
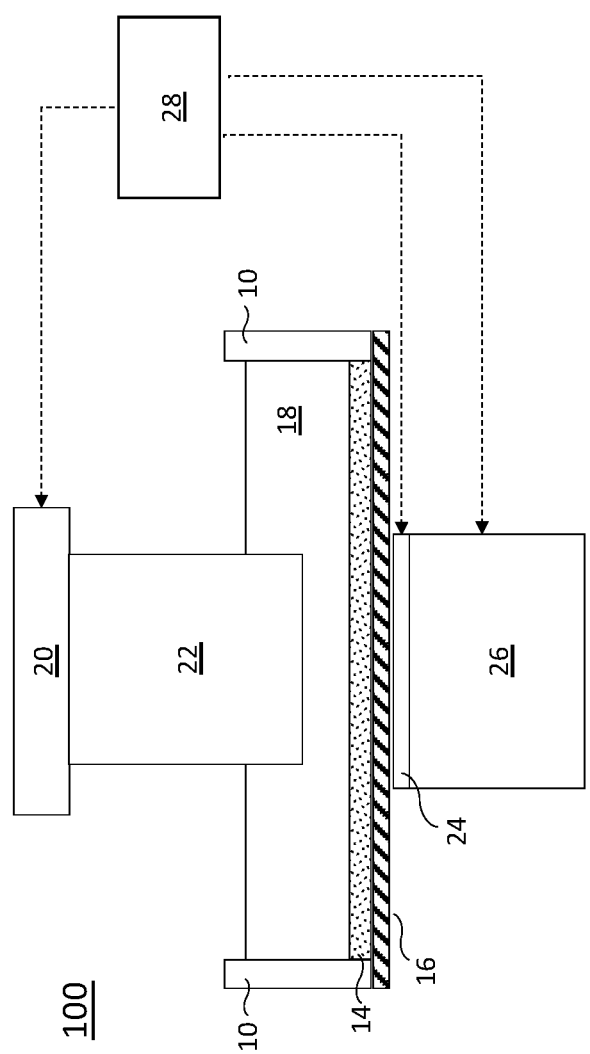
FIG. 1 depicts a schematic cross-section of a 3D printing system in which an object undergoes fabrication in a tank containing a photo-curing liquid resin.

Before describing the present methods in detail, a brief background concerning the vat polymerization process and environment will help in understanding some of the later discussion herein. FIG. 1 depicts a cross-section of 3D printing system 100, in which electromagnetic radiation (e.g., ultra-violet ("UV") light) is used to cure a photo-curing liquid resin (typically a liquid polymer) 18 in order to fabricate an object (e.g., a 3D object) 22. Object 22 is fabricated layer by layer (i.e., a new layer of object 22 is be formed by photo-curing a layer of liquid polymer 18 adjacent to the bottom surface of object 22), and as each new layer is formed the object may be raised by build plate 20, allowing a next layer of photo-curing liquid resin 18 to be drawn under the newly formed layer. This process may be repeated multiple times to form additional layers until fabrication of the object is complete.

The 3D printing system 100 includes tank 10 for containing the photo-curing liquid resin 18. The bottom of tank 10 (or at least a portion thereof) is sealed (i.e., to prevent the photo-curing liquid polymer 18 from leaking out of tank 10) by a flexible membrane 14, which is transparent (or nearly so) at wavelengths of interest for curing of the resin to allow electromagnetic radiation from a light source 26 to enter into tank 10. A mask 24 (e.g., a liquid crystal layer) is disposed between light source 26 and the photo-curing liquid resin 18 to allow the selective curing of the liquid resin (which allows the formation of 3D object into desired shapes/patterns). In various embodiments, collimation and diffusion elements such as lenses, reflectors, filters, and/or films may be positioned between mask 24 and light source 26. These elements are not shown in the illustrations so as to not unnecessarily obscure the drawing.

A platen or backing member 16 formed of borosilicate glass or other material is disposed between the mask 24 and the flexible membrane 14 and provides structural support. The platen is also transparent (or nearly so) at the one or more wavelengths of interest for curing the resin. In other instances, platen 16 may be metal or plastic and include a transparent window to allow electromagnetic radiation from light source 26 to enter into tank 10. In other embodiments, the mask 24 itself may be used in place of a separate window and its perimeter sealed with a gasket. Note that although the mask 24, platen 16, and membrane 14 are shown as being displaced from one another by some distance, in practice these components may be positioned so as to touch one another, so as to prevent refraction at any air interfaces. Flexible membrane 14 is secured to the edges of tank 10 or to a replaceable cartridge assembly (not shown) so as to maintain a liquid-tight perimeter at the edges of the tank or other opening ("liquid-tight" meaning that the tank does not leak during normal use).

When fabricating a layer of object 22 using 3D printing system 100, electromagnetic radiation is emitted from radiation source 26 through mask 24, platen 16, and membrane 14 into tank 10. The electromagnetic radiation forms an image on an image plane adjacent the bottom of object 22. Areas of high (or moderate) intensity within the image cause curing of localized regions of the photo-curing liquid resin 18. The newly cured layer adheres to the former bottom surface of object 22 and substantially does not adhere to the bottom surface of tank 10 due to the presence of flexible membrane 14. After the newly cured layer has been formed, the emission of electromagnetic radiation may temporarily be suspended (or not, in the case of "continuous printing") while the extraction plate 20 is raised away from the bottom of the tank so that another new layer of object 22 may be printed.

Figure 2:
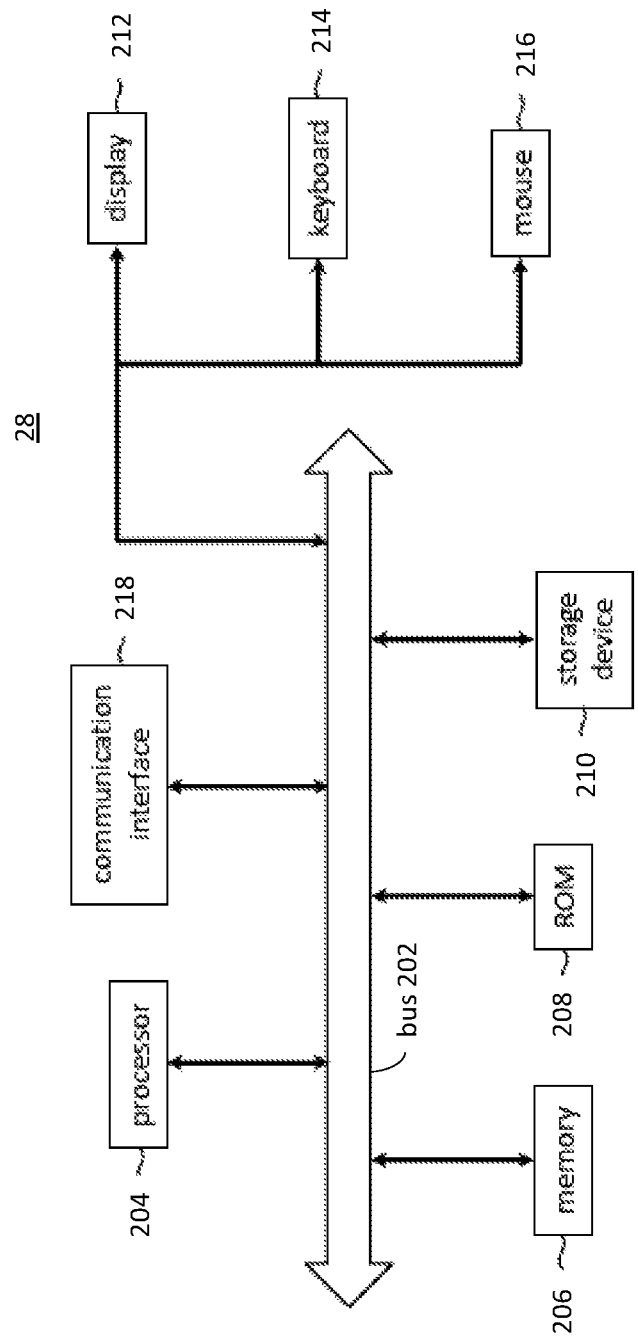
FIG. 2 depicts an example of a controller for the 3D printing system illustrated in FIG. 1.

Aspects of the printing process are directed by a controller 28, which may be implemented as a processor-based system with a processor-readable storage medium having processor-executable instructions stored thereon so that when the processor executes those instructions it performs operations to cause the actions described above. For example, among other things controller 28 may instruct raising/lowering of the extraction plate 20, activation and deactivation of the light source 26, and the projection of cross-sectional images of the object under fabrication via mask 24 (e.g., as determined by the output of a slicer application either separate from the printer 100 or executing on controller 28). FIG. 2 provides an example of such a controller 28, but not all such controllers need have all of the features of controller 28. For example, certain controllers may not include a display inasmuch as the display function may be provided by a client computer communicatively coupled to the controller or a display function may be unnecessary. Such details are not critical to the present invention.

Controller 28 includes a bus 202 or other communication mechanism for communicating information, and a processor 204 (e.g., a microprocessor) coupled with the bus 202 for processing information. Controller 28 also includes a main memory 206, such as a random access memory (RAM) or other dynamic storage device, coupled to the bus 202 for storing information and instructions (e.g., g-code) to be executed by processor 204. Main memory 206 also may be used for storing temporary variables or other intermediate information during execution of instructions to be executed by processor 204. Controller 28 further includes a read only memory (ROM) 208 or other static storage device coupled to the bus 302 for storing static information and instructions for the processor 204. A storage device 210, for example a hard disk, flash memory-based storage medium, or other storage medium from which processor 204 can read, is provided and coupled to the bus 202 for storing information and instructions (e.g., operating systems, applications programs such as a slicer application, and the like).

Controller 28 may be coupled via the bus 202 to a display 212, such as a flat panel display, for displaying information to a computer user. An input device 214, such as a keyboard including alphanumeric and other keys, may be coupled to the bus 202 for communicating information and command selections to the processor 204. Another type of user input device is cursor control device 216, such as a mouse, a trackpad, or similar input device for communicating direction information and command selections to processor 204 and for controlling cursor movement on the display 212. Other user interface devices, such as microphones, speakers, etc. are not shown in detail but may be involved with the receipt of user input and/or presentation of output.

Controller 28 also includes a communication interface 218 coupled to the bus 202. Communication interface 218 may provide a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that controller 28 can send and receive messages and data, e.g., a digital file representing 3D articles to be produced using printer 100, in a format provided in accordance with the present invention, through the communication interface 218 and in that way communicate with hosts accessible via the Internet. It is noted that the components of controller 28 may be located in a single device or located in a plurality of physically and/or geographically distributed devices.

Figure 3:
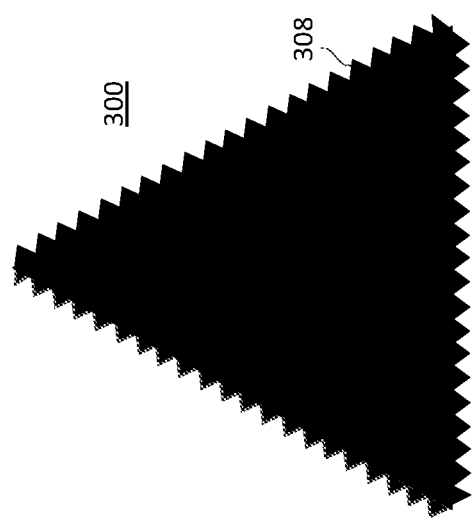
FIGS. 3, 4 and 5 illustrate aspects of a design for a 3D print job that includes multiple instances of an article over the plane of a build plate of a printer apparatus and in multiple layers, and, in particular.

Now referring to FIG. 3, an example of one instance of an article 300 to be printed is illustrated. As shown, article 300 is a hypothetical component of a larger machine, and is not necessarily intended to represent any particular article. Instead, it is being used for pedagogical purposes in order to explain aspects of the present invention.

Figure 4:
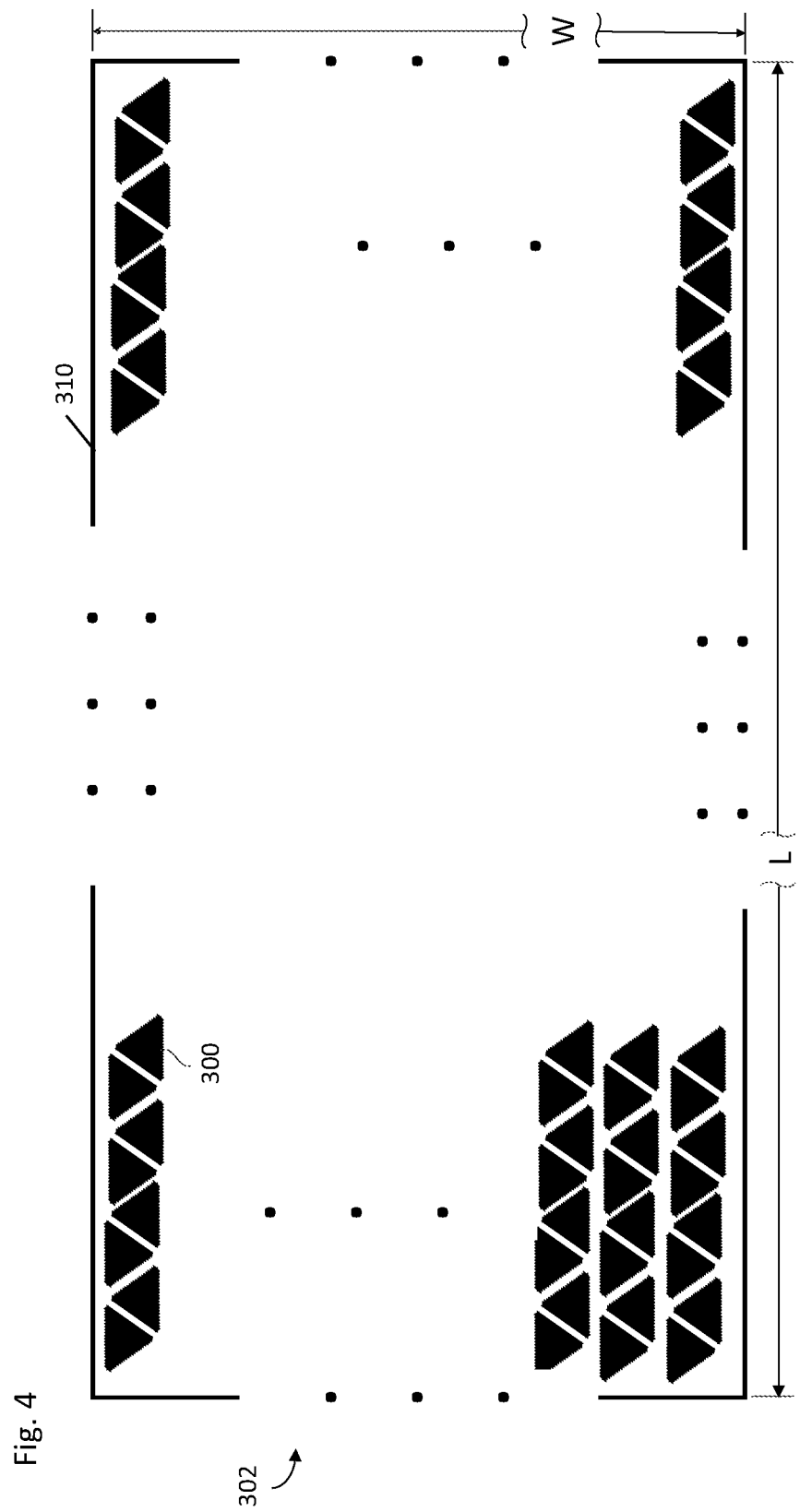
Figure 5:
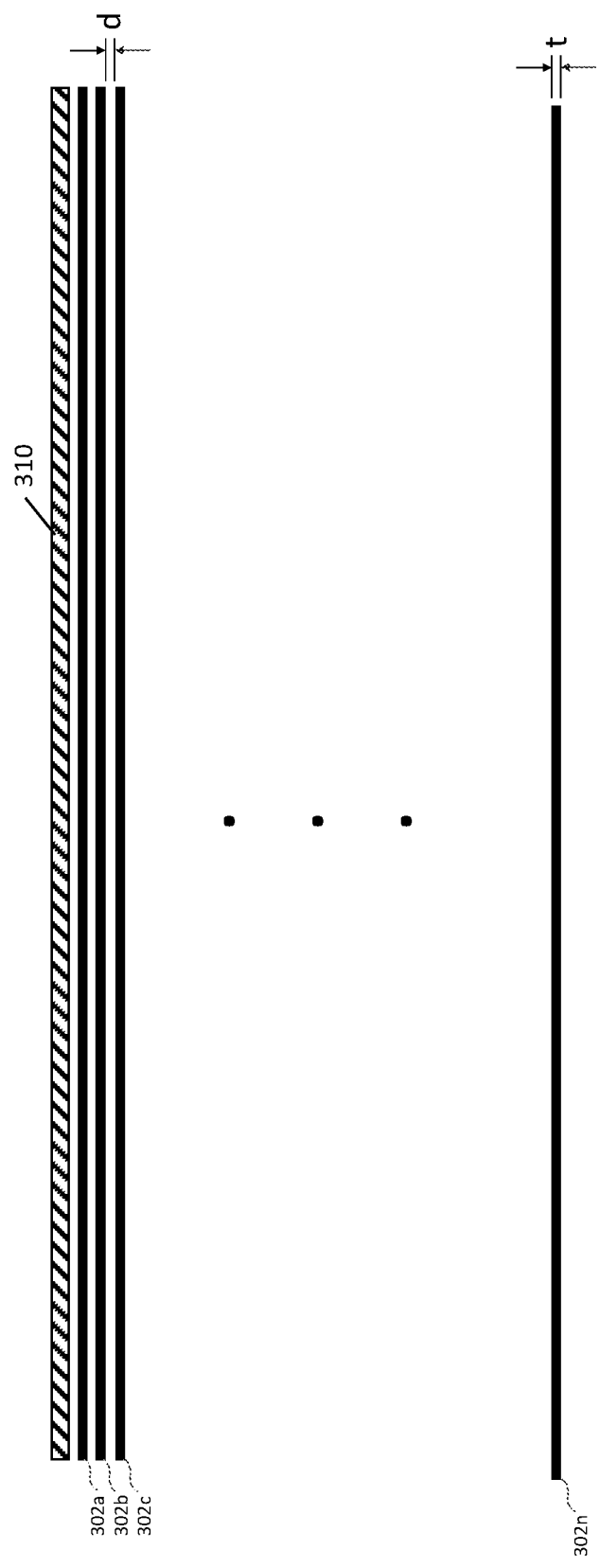

Referring to FIGS. 3, 4 and 5, assume that a particular design calls for printing multiple instances of article 300 across the length (L) and breadth (W) of a build plate 310 of a printer apparatus such as printer 100 shown in FIG. 1. FIG. 4 shown a plan view of a single layer 302 of instances of article 300 against the backdrop of build plate 310, and FIG. 5 illustrates an elevation view of multiple such layers 302a, 302b, 302c, . . . , 302n, as are to be printed. The area of each individual instance of article 300 is much less than that of the area of the build plate 310, so for each thickness "t" of layers 302a, 302b, 302c, . . . , 302n of articles 300 to be printed there will be tens, dozens, or even hundreds of instances of article 300. A thickness "t" may correspond to one, two, or more print layers of printer 100, and the distance "d" between layers may be as little as a single print layer or multiple ones thereof of printer 100. By "print layer" we mean a layer height as specified for a slicer program, which represents the minimum thickness of a printed layer for the target printer. For example, for a particular design involving multiple instances of article 300, thickness "t" may correspond to 1 mm, 2 mm, 5 mm, or another thickness, and distance "d" may correspond to 100 μm, 200 μm, 500 μm, or another distance.

Typically, the 3D design application output (e.g., .stl) file for the intended design involving multiple instances of article 300 will be quite large, e.g., on the order of tens of GB, because it must account for every instance of article 300 to be printed. For example, if article 300 is made up of many irregular angles, as is shown by the edge details 308 of article 300 in FIG. 3, then each article 300 must be represented by many polygons in the output file in order to faithfully reproduce such details in the printed article. Accommodating this large number of polygons for all of the instances of article 300 to be included in the design results in the large file size for the output file. These large file sizes pose difficulties in that they are inconvenient to store, share, upload, download, and otherwise communicate. They also may take several hours or even days for a slicer application to process. Creating support structures for some articles will also be computationally intensive.

Figure 6:
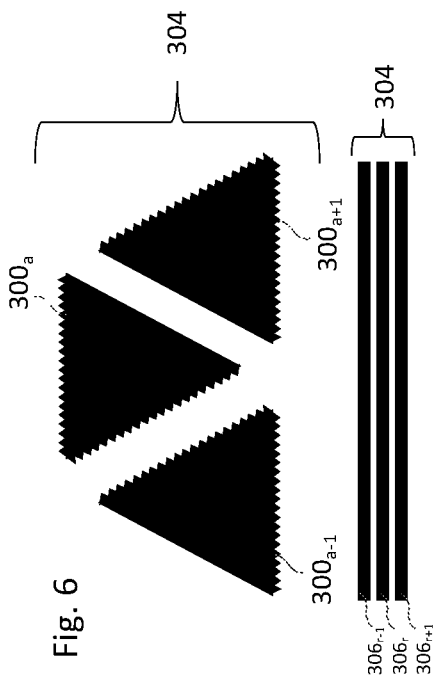
FIG. 6 illustrates an example of a unit cell for the 3D print job for the design highlighted in FIGS. 3-5, according to an embodiment of the present invention.

The present invention eliminates the need for these large 3D design application output files by defining a "unit cell" for a particular design that will involving involve the printing of multiple instances of a repeating pattern. The unit cell preferably includes an instance of the of the element that repeats in the overall design, along with the nearest neighbors of that instance in three spatial dimensions. For example, in the case of article 300, as shown in FIG. 6, a unit cell 304 in accordance with the present invention includes an instance $300_a$ of the element that repeats in the overall design for a layer $306r$, along with neighbors 300a-1 and 300a+1 in layer $306r$ (e.g., in the plane of the build plate). Also included in the unit cell are neighboring elements of $300_a$, $300_{a-1}$, and $300_{a+1}$ in neighboring layers $306_{r+1}$ and $306_{r-1}$ (in the plane orthogonal to the build plate). Thus, the unit cell includes 9 instances of article 300 which can be represented in the output file of a 3D design application. This represents a small fraction of the total number of instances of article 300 than would be included in the conventional output file specifying the entirety of the overall design, hence, the output file for the unit cell is considerably smaller, in some cases orders of magnitude smaller, than the conventional output file size.

To print the overall design using the unit cell 304, the output file specifying the unit cell is provided as an input to a slicer application, and the slicer application is instructed to compute the printer g-code by reproducing the unit cell envelope across the entirety of the target printer build plate (or other specified area) for a specified number of layers. For example, the slicer application may be instructed to compute the area of a single instance of the unit cell and to replicate the unit cell per unit areas over the length and breadth of the build plate that is, to produce printer instructions to print an instance of the elements of the unit cell 304 per unit cell area over the entirety of the build plate for each print layer that makes up a layer for the intended design. Similar instructions are produced for the number of layers called for by the entire design. Support structures may be included in the unit cell where needed.

Note that while the above example has multiple instances of the same repeating element per unit cell, the present invention is not so restrictive as to require such circumstances. That is, there may be different articles included within a unit cell, in either or both of the plane of the build plate or the plane orthogonal thereto, so long as the entire unit cell is a repeating element of the design. This does not necessarily mean that non-repeating elements cannot be included in an overall design, as indeed that may be the case in both the plane of the build plate and/or the plane orthogonal thereto, but the file size reductions afforded by the present invention may not be as dramatic as where the number of repeating instances of the unit cell are a significant fraction of the overall design.

To accommodate the present invention, the slicer application will need to know, or be able to compute, the number of unit cells and non-repeating elements, if any, that can be accommodated within a build envelope of a single layer. That is determined by the area of the unit cell and non-repeating elements, if any, and the area of the build plate. Various optimizations may be employed to accommodate as many instances of a unit cell and non-repeating elements, if any, over the build envelop of a particular printer. For example, unit cells may be composed of repeating elements arranged in differing orientations (as shown in FIG. 6) so as to minimize the unit area of the unit cell. Also, non-repeating elements, if any, may be relegated to the border areas of the build envelope so as to reserve the central area thereof for printing of the unit cells. This arrangement may be reversed in cases where the overall area of the build envelope is better optimized if the border areas of the build envelope are used for printing of the unit cells.

In generally then, the present invention alleviates the problems encountered with the creation and processing of very large 3D object files for 3D printing. The object design is represented in a compact fashion as a "unit cell" (that is, a portion of an object design that is replicated over a plane of a build area for some number of slices in a direction orthogonal to the build area plane) and replication of that cell is performed in what may be regarded as an image domain at the time the slicing operation takes place. This procedure can be applied in 3D printing technologies other than just vat polymerization technologies where layer-by-layer formation of the article(s) under fabrication take place. We refer to this as replication in an image domain because the slicer is producing "images" (or perhaps negatives) of each layer for the object to be fabricated, e.g., for presentation via a mask 24 or similar arrangement in a 3D printing apparatus. In applications where no actual mask is used, it nevertheless remains the case that layer-by-layer deconstruction of the object takes place and it is at the time of generation of the layer representation of the unit cell that the replication of that representation across the build plate (or other build area) of the target printer is performed, in accordance with embodiments of the invention.

Thus, methods of representing 3D articles to be produced using 3D printing processes, including but not limited to vat polymerization processes, in digital file formats and printing those articles have been described.

What is claimed is:

1. A method, comprising:
   for a design involving multiple occurrences of a three dimensional (3D) article to be printed, defining a unit cell that represents an element of the three-dimensional (3D) article that repeats in each one of the multiple occurrences of the 3D article that makes up the design and providing an output file that includes the unit cell to a slicer application, wherein the unit cell is a three-dimensional object;
   generating, by the slicer application, a cross-sectional image of the design, for use by a target printer to manufacture the design, by for each of the multiple occurrences of the 3D article, replicating an image of the unit cell over a length and breadth of a build plate of the target printer for a layer of the design that includes the element represented by the unit cell, wherein the image of the unit cell is a two-dimensional area; and
   printing the layer of the design by the target printer using the cross-sectional image produced by the slicer application.

2. The method of claim 1, wherein the image of the unit cell is replicated over an entirety of the build plate.

3. The method of claim 1, wherein the cross-sectional image is presented by a mask of the target printer.

* * * * *